(12) United States Patent
Wang

(10) Patent No.: US 7,986,476 B2
(45) Date of Patent: Jul. 26, 2011

(54) CAMERA DEVICE WITH IMAGE SENSOR DRIVING APPARATUS

(75) Inventor: Shao-Hung Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 15 days.

(21) Appl. No.: 12/647,552

(22) Filed: Dec. 28, 2009

(65) Prior Publication Data
US 2010/0328790 A1    Dec. 30, 2010

(30) Foreign Application Priority Data
Jun. 29, 2009    (CN) .......................... 2009 1 0303806

(51) Int. Cl.
*G02B 7/02*    (2006.01)
*H04N 5/225*    (2006.01)
(52) U.S. Cl. ........................ 359/823; 348/374
(58) Field of Classification Search .................. 359/819, 359/823, 826; 348/335, 340, 360, 373, 374, 348/375
See application file for complete search history.

(56) References Cited

U.S. PATENT DOCUMENTS

| | | | | |
|---|---|---|---|---|
| 6,031,998 A | * | 2/2000 | Shono | ............................. 396/75 |
| 6,366,323 B1 | * | 4/2002 | Shono | ........................... 348/340 |
| 6,670,986 B1 | * | 12/2003 | Ben Shoshan et al. | .... 348/219.1 |
| RE40,609 E | * | 12/2008 | Shono | ........................... 348/360 |
| RE40,610 E | * | 12/2008 | Shono | ........................... 348/360 |

* cited by examiner

*Primary Examiner* — Ricky L Mack
*Assistant Examiner* — Tuyen Tra
(74) *Attorney, Agent, or Firm* — Zhigang Ma

(57) ABSTRACT

A camera device includes a housing, a lens module, a holder, an image sensor, a driving apparatus, and an elastic member. The housing includes a front housing and a back housing. The lens module is assembled on the outer surface of the front housing away from the back housing. The holder is received between the front housing and the back housing, the holder is movable along the optical axis of the lens module and defines a screw hole thereon. The image sensor is fixed on the holder and facing the lens module. The driving apparatus is fixed on the back housing, the driving apparatus includes a motor and a lead screw rotated by the motor, the lead screw is inserted into and meshing with the screw hole for moving the holder. The elastic member has two ends thereof connecting to the holder and the back housing respectively.

20 Claims, 2 Drawing Sheets

CAMERA DEVICE WITH IMAGE SENSOR DRIVING APPARATUS

BACKGROUND

1. Technical Field

The present disclosure relates to camera devices and, particularly, to a camera device having an image sensor driving apparatus.

2. Description of Related Art

Portable digital electronic devices have become very popular. Those equipped with integral cameras have been particularly successful. Despite this commercial success, without a focusing function, integrated digital camera devices are more like toys or ornaments rather than real cameras. However, to have a focus function, the camera device of the portable digital electronic device not only needs a lens driving device for moving lenses in the camera device, but also needs a number of transmission devices to cooperate with the lens driving device, accordingly, the camera device of the portable digital electronic device is more bulky and difficult to accommodate when trying to further miniaturize portable digital electronic devices.

What is needed, therefore, is a camera device with a simple structure to overcome or at least mitigate the above-described problem.

BRIEF DESCRIPTION OF THE DRAWINGS

Many aspects of the present camera device can be better understood with reference to the accompanying drawings. The components in the drawings are not necessarily drawn to scale, the emphasis instead being placed upon clearly illustrating the principle of the present camera device. In the drawings, all the views are schematic.

DETAILED DESCRIPTION

Embodiments of the present disclosure will now be described in detail below, with reference to the accompanying drawings.

Figure 1:
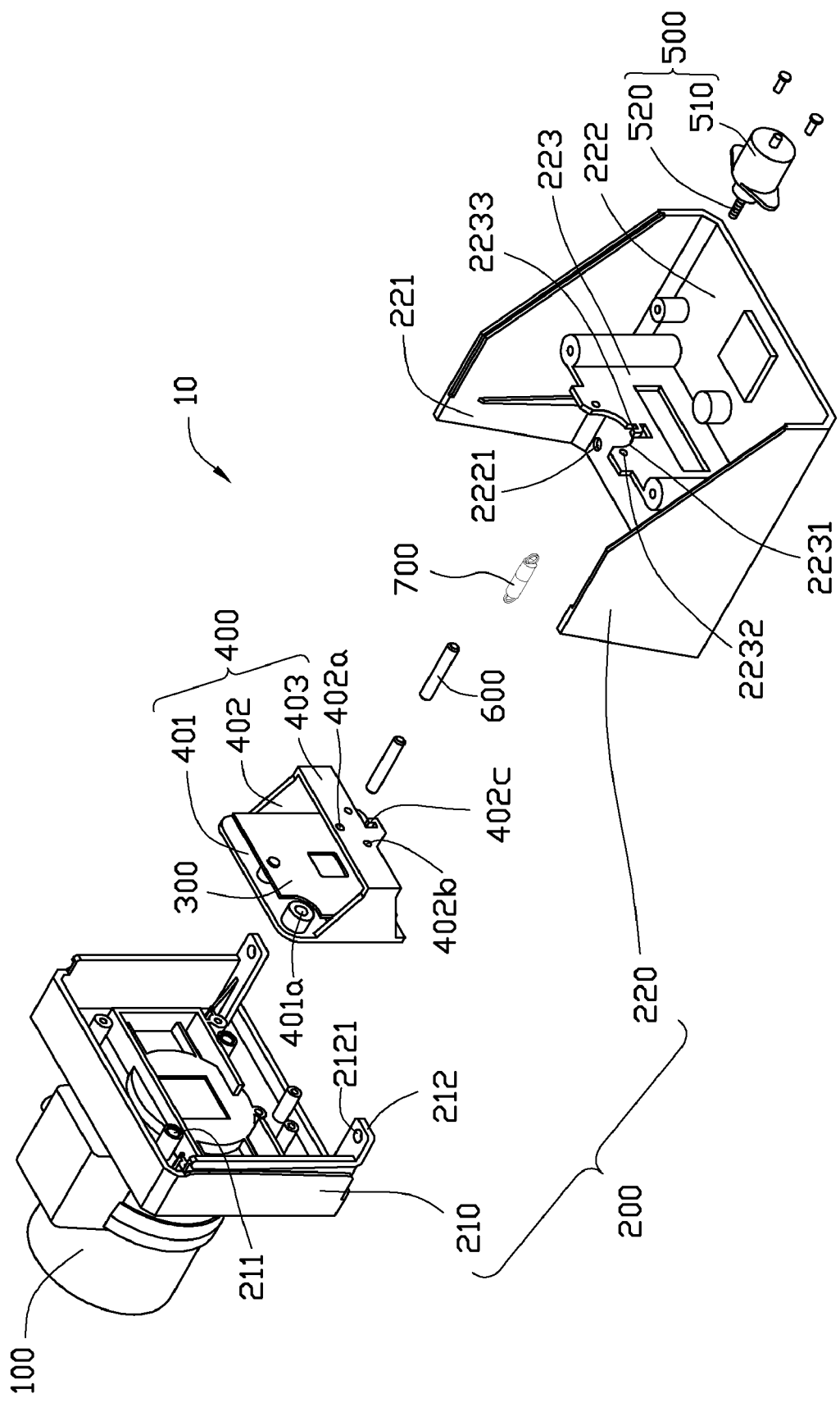
FIG. 1 is an exploded, isometric view of a camera device according to an exemplary embodiment.
Figure 2:
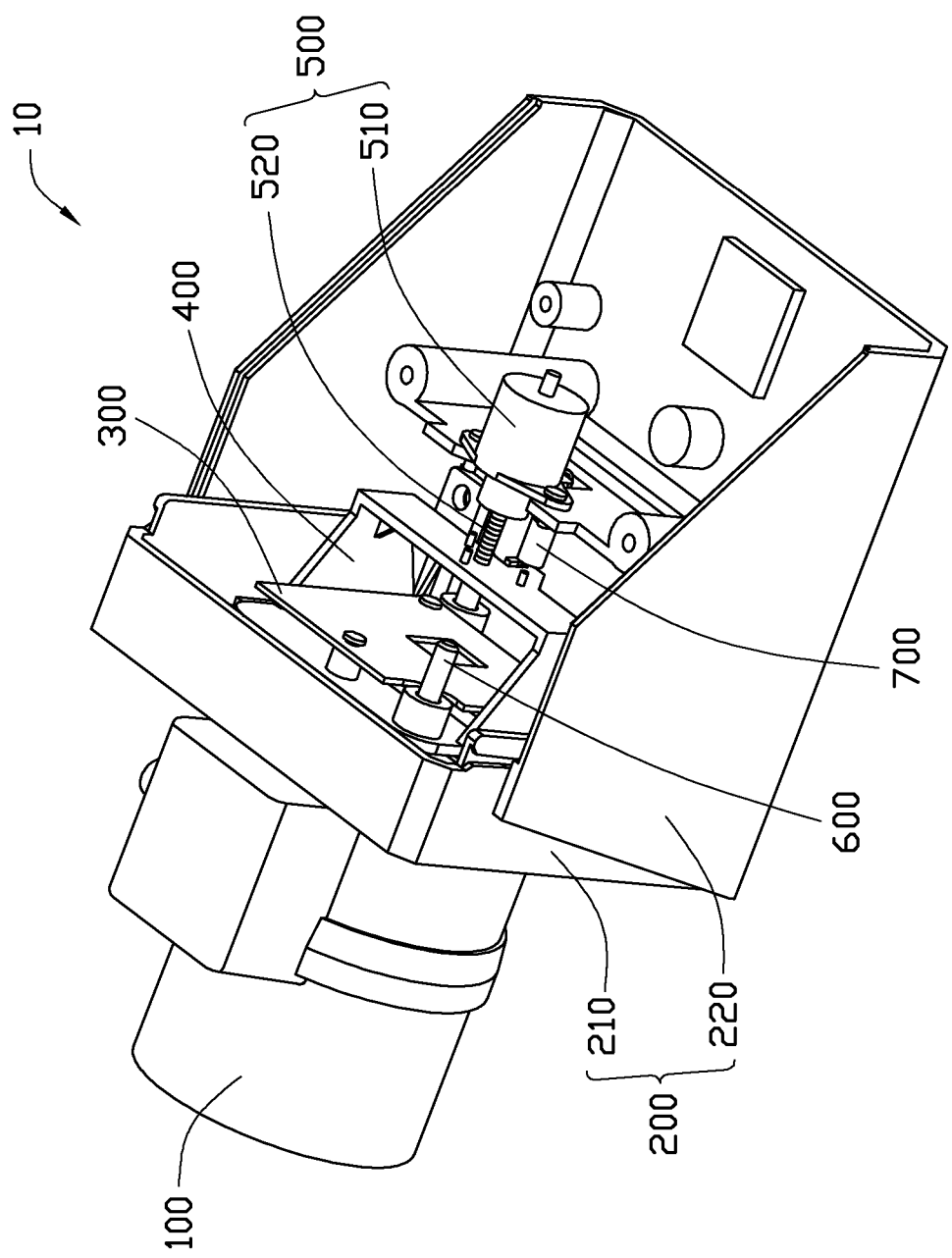
FIG. 2 is an assembled, isometric view of the camera device of FIG. 1.

Referring to FIGS. 1 and 2, a camera device 10, according to an exemplary embodiment, is shown. The camera device 10 includes a lens module 100, a housing 200, an image sensor 300, a holder 400, and a driving apparatus 500.

The housing 200 includes a front housing 210 and a back housing 220. The lens module 100 is assembled on the outer surface of the front housing 210 away from the back housing 220. The front housing 210 includes two connecting potions 212 extending towards the back housing 220, and defines a number of receiving holes 211. Each of the two connecting portions 212 defines a screw hole 2121 therein. The axis of each receiving hole 211 is substantially parallel to the optical axis of the lens module 100. A number of linear guide rods 600 are received in the receiving holes 211 respectively, and are substantially parallel to the optical axis of the lens module 100. The number of the receiving holes 211 and the number of the connecting potion 212 can also be three, four, and so on.

The back housing 220 includes a bottom wall 222 and two sidewalls 221 extending from two opposite ends of the bottom wall 222. The bottom wall 222 defines two screw holes 2221 corresponding to the two screw holes 2121, thus, the front housing 210 and the back housing 220 can be secured to each other by two screws (not shown) each running through one screw hole 2221 and one screw hole 2121. The back housing 220 includes a fixing board 223 fixed on the bottom wall 222 substantially perpendicular to the optical axis of the lens module 100. The fixing board 223 defines a semicircular hole 2231 and two screw holes 2232 disposed at two opposite sides of the semicircular hole 2231. The fixing board 223 includes a hook 2233.

The holder 400 is received between the front housing 210 and the back housing 220. The holder 400 includes a front wall 401, a back wall 402, and sidewalls 403 connecting the front wall 401 to the back wall 402. The front wall 401 and the back wall 402 are substantially parallel to each other, and are substantially perpendicular to the optical axis of the lens module 100. The image sensor 300 is fixed on the front wall 401. The image sensor 300 faces and is substantially aligned with the lens module 100. The front wall 401 defines a number of guide holes 401a corresponding to the linear guide rods 600, therefore, the holder 400 is slidable along the linear guide rods 600. The back wall 402 defines a screw hole 402a. The back wall 402 includes a hook 402c corresponding the hook 2233 on the fixing board 223, and an elastic member 700 with two ends thereof connected to the hook 402c and the hook 2233 respectively. The elastic member 700 may be kept pressed between the hook 402c and the hook 2233, or may be kept elongated between the hook 402c and the hook 2233 during moving the holder 400. In the present embodiment, the elastic member 700 is a spring.

The driving apparatus 500 includes a motor 510 and a lead screw 520 rotated by the motor 510. The driving apparatus 500 is fixed on the fixing board 223 with the lead screw 520 substantially parallel to the optical axis of the lens module 100. The lead screw 520 is inserted into the screw hole 402a and meshes with the screw hole 402a, therefore, the holder 400 can be moved along a direction parallel to the optical axis of the lens module 100 by rotating the lead screw 520.

In the present embodiment, the image sensor 300 can be moved along the optical axis of the lens module 100 by the driving apparatus 500 without any other transmission devices, therefore, the camera device not only can have focusing function, but also can be small in size. Furthermore, because the elastic member 700 is either kept in a compressed state or an elongated state, tension is provided to prevent any problems caused by excess movement associated with the loose fit between the screw hole 402a and the lead screw 520.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A camera device comprising:
    a housing comprising a front housing and a back housing;
    a lens module assembled on the outer surface of the front housing away from the back housing;
    a holder received between the front housing and the back housing, the holder being movable along the optical axis of the lens module and defining a screw hole thereon;
    an image sensor fixed on the holder and facing the lens module;
    a driving apparatus fixed on the back housing, the driving apparatus comprising a motor and a lead screw rotated by the motor, the lead screw being inserted into and meshing with the screw hole for moving the holder; and an elastic member with two ends thereof connecting to the holder and the back housing respectively.

2. The camera device as claimed in claim 1, wherein the front housing defines a plurality of receiving holes, the axis of each receiving hole is substantially parallel to the optical axis of the lens module, and the camera device comprises a plurality of linear guide rods for guiding the movement direction of the holder received in the receiving holes respectively.

3. The camera device as claimed in claim 2, wherein the holder defines a plurality of guide holes corresponding to the linear guide rods.

4. The camera device as claimed in claim 1, wherein the holder comprises a front wall, a back wall, and sidewalls connecting the front wall to the back wall, the image sensor is fixed to the front wall, and the screw hole is defined on the back wall.

5. The camera device as claimed in claim 4, wherein the front wall and the back wall are substantially parallel to each other, and are substantially perpendicular to the optical axis of the lens module.

6. The camera device as claimed in claim 4, wherein the back housing comprises a fixing board substantially perpendicular to the optical axis of the lens module, the driving apparatus is fixed on the fixing board with the lead screw thereof substantially parallel to the optical axis of the lens module.

7. The camera device as claimed in claim 6, wherein each of the back wall and the fixing board comprises a hook, and two ends of the elastic member is connected to the two hooks respectively.

8. The camera device as claimed in claim 1, wherein the elastic member is a spring.

9. The camera device as claimed in claim 1, wherein the elastic member is kept pressed between the holder and the back housing during moving the holder.

10. The camera device as claimed in claim 1, wherein the elastic member is kept elongated between the holder and the back housing during moving the holder.

11. A camera device comprising:
a housing;
a lens module assembled on an outer surface of the housing;
a holder received in the housing, the holder being movable along the optical axis of the lens module and defining a screw hole thereon;
an image sensor fixed on the holder and facing the lens module;
a driving apparatus fixed on the housing, the driving apparatus comprising a motor and a lead screw rotated by the motor, the lead screw being inserted into and meshing with the screw hole for moving the holder; and
an elastic member with two ends thereof connecting to the holder and the housing respectively.

12. The camera device as claimed in claim 11, wherein the housing defines a plurality of receiving holes, the axis of each receiving hole is substantially parallel to the optical axis of the lens module, and the camera device comprises a plurality of linear guide rods for guiding the movement direction of the holder received in the receiving holes respectively.

13. The camera device as claimed in claim 12, wherein the holder defines a plurality of guide holes corresponding to the linear guide rods.

14. The camera device as claimed in claim 11, wherein the holder comprises a front wall, a back wall, and sidewalls connecting the front wall to the back wall, the image sensor is fixed to the front wall, and the screw hole is defined on the back wall.

15. The camera device as claimed in claim 14, wherein the front wall and the back wall are substantially parallel to each other, and are substantially perpendicular to the optical axis of the lens module.

16. The camera device as claimed in claim 14, wherein the housing comprises a fixing board substantially perpendicular to the optical axis of the lens module, the driving apparatus is fixed on the fixing board with the lead screw thereof substantially parallel to the optical axis of the lens module.

17. The camera device as claimed in claim 16, wherein each of the back wall and the fixing board comprises a hook, and two ends of the elastic member is connected to the two hooks respectively.

18. The camera device as claimed in claim 11, wherein the elastic member is a spring.

19. The camera device as claimed in claim 11, wherein the elastic member keeps being pressed between the holder and the housing during moving the holder.

20. The camera device as claimed in claim 11, wherein the elastic member keeps being elongated between the holder and the housing during moving the holder.

* * * * *